(12) United States Patent
Ghosh et al.

(10) Patent No.: US 10,299,295 B2
(45) Date of Patent: *May 21, 2019

(54) APPARATUS, COMPUTER READABLE MEDIUM, AND METHOD FOR PRE-ASSOCIATION FRAME EXCHANGE USING RANDOM ACCESS IN A HIGH EFFICIENCY WIRELESS LOCAL-AREA NETWORK

(71) Applicant: Intel IP Corporation, Santa Clara, CA (US)

(72) Inventors: Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,317

(22) Filed: Nov. 27, 2017

(65) Prior Publication Data

US 2018/0167978 A1  Jun. 14, 2018

Related U.S. Application Data

(63) Continuation of application No. 14/862,197, filed on Sep. 23, 2015, now Pat. No. 9,832,792.

(Continued)

(51) Int. Cl.
*H04W 74/08* (2009.01)
*H04L 5/00* (2006.01)
*H04W 84/12* (2009.01)

(52) U.S. Cl.
CPC ....... *H04W 74/0833* (2013.01); *H04L 5/0007* (2013.01); *H04W 84/12* (2013.01)

(58) Field of Classification Search
CPC .. H04W 74/0833; H04W 84/12; H04L 5/0007
See application file for complete search history.

(56) References Cited

U.S. PATENT DOCUMENTS 8,571,010 B1   10/2013   Zhang et al.
9,832,792 B2 * 11/2017   Ghosh ............... H04W 74/0833
(Continued)

FOREIGN PATENT DOCUMENTS

CN        106102181 A      11/2016

OTHER PUBLICATIONS

"U.S. Appl. No. 14/862,197, Examiner Interview Summary dated Jun. 28, 2017", 3 pgs.

(Continued)

*Primary Examiner* — Habte Mered
(74) *Attorney, Agent, or Firm* — Schwegman Lundberg & Woessner, P.A.

(57) ABSTRACT

Methods, apparatuses, and computer readable media for pre-association frame exchange using random access are disclosed. An apparatus of a high-efficiency wireless local-area network (HEW) master station is disclosed. The apparatus includes transceiver circuitry and processing circuitry which may be configured to generate a trigger frame for uplink random access (TF-R), and transmit the TF-R. The transceiver circuitry and processing circuitry may be further configured to receive one or more responses in accordance with orthogonal frequency division multiple-access (OFDMA) to the trigger frame from one or more pre-association stations where the responses comprise pre-association identifiers corresponding to the one or more pre-association stations. Moreover, the transceiver circuitry and processing circuitry may be further configured to generate one or more acknowledgements to the one or more pre-association stations, and transmit the acknowledgements in (Continued)

accordance with OFDMA to the one or more pre-association stations.

23 Claims, 6 Drawing Sheets

Related U.S. Application Data

(60) Provisional application No. 62/155,305, filed on Apr. 30, 2015.

(56) References Cited

U.S. PATENT DOCUMENTS

| | | | |
|---|---|---|---|
| 2014/0307653 A1* | 10/2014 | Liu | H04W 74/006 370/329 |
| 2015/0319782 A1 | 11/2015 | Chu et al. | |
| 2016/0028452 A1 | 1/2016 | Chu et al. | |
| 2016/0029373 A1* | 1/2016 | Seok | H04L 5/0055 370/338 |
| 2016/0113034 A1* | 4/2016 | Seok | H04W 74/04 370/329 |
| 2016/0128024 A1* | 5/2016 | Frederiks | H04W 72/04 370/329 |
| 2016/0323879 A1 | 11/2016 | Ghosh et al. | |
| 2017/0048890 A1* | 2/2017 | Sun | H04W 74/08 |

OTHER PUBLICATIONS

"U.S. Appl. No. 14/862,197, Non Final Office Action dated Feb. 27, 2017", 21 pgs.

"U.S. Appl. No. 14/862,197, Notice of Allowance dated Jul. 27, 2017", 9 pgs.

"U.S. Appl. No. 14/862,197, Response filed Jun. 27, 2017 to Non Final Office Action dated Feb. 27, 2017", 8 pgs.

* cited by examiner

APPARATUS, COMPUTER READABLE MEDIUM, AND METHOD FOR PRE-ASSOCIATION FRAME EXCHANGE USING RANDOM ACCESS IN A HIGH EFFICIENCY WIRELESS LOCAL-AREA NETWORK

PRIORITY CLAIM

This application is a continuation of U.S. patent application Ser. No. 14/862,197, filed Sep. 23, 2015, which claims the benefit of priority under 35 USC 119(e) to U.S. Provisional Patent Application Ser. No. 62/155,305, filed Apr. 30, 2015, each of which is incorporated herein by reference in their entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to pre-association frame exchange. Some embodiments relate to pre-association frame exchange within a random access period. Some embodiments relate to using pre-association identifiers. Some embodiments relate to acknowledging frames received from pre-association HEW station.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, it may be difficult to identify a device. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
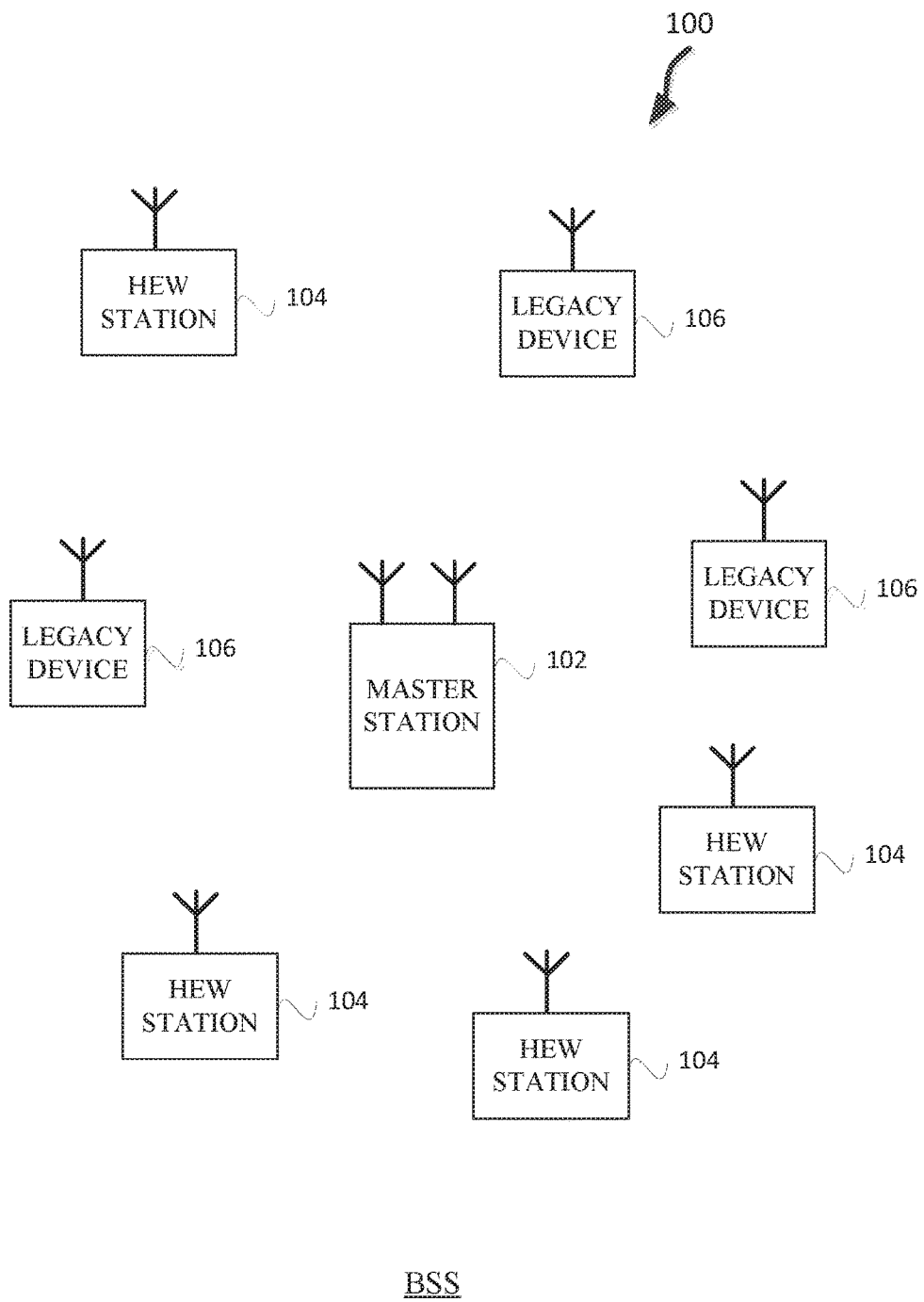
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 20001x, CDMA 2000 Evolution-Data Optimized (EV-DO), Interim Standard 2000

(IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In some embodiments HEW STAs 104 may associate with master stations 102. The master station 102 may receive a request for a HEW STA 104 to associate with the master station 102 and, in response, send an association identifier to the HEW STA 104. The master station 102 may then receive data from the HEW STA 104 and forward it to another network such as the Internet. The master station 102 may also receive data from another network and forward it to the HEW STA 104. The master station 102 may keep a record of the associated HEW STA 104 with an Internet Protocol address associated with the association identifier.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-6.

Figure 2:
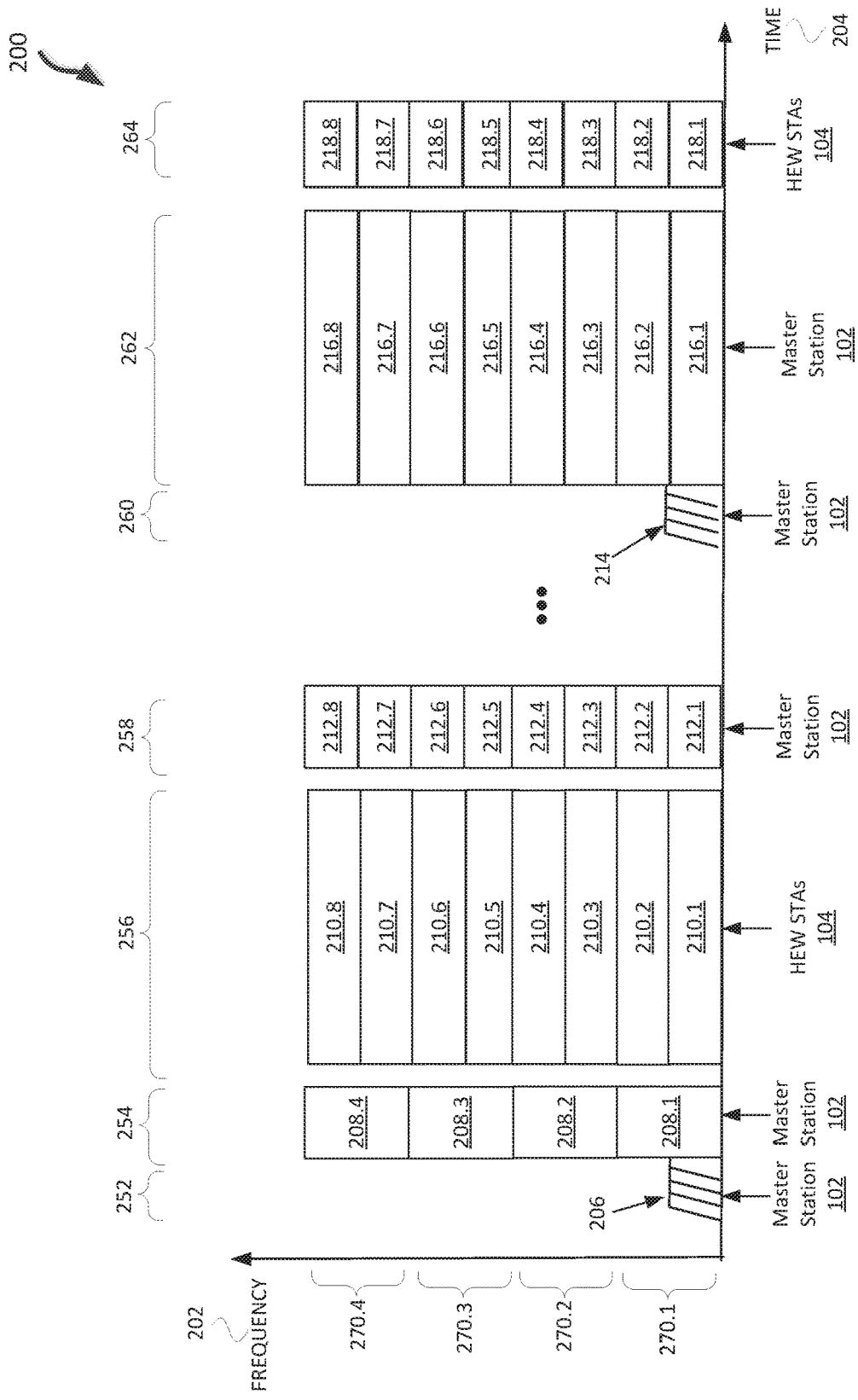
FIG. 2 illustrates a method for pre-association frame exchange in accordance with some embodiments.

FIG. 2 illustrates a method 200 for pre-association frame exchange in accordance with some embodiments. Illustrated in FIG. 2 is frequency 202 along a vertical axis and time 204 along a horizontal axis. The frequency 202 may include multiple channels 270, which in some embodiments may be termed sub-channels. The actor is listed below the time. As illustrated there are four channels 270, but there may be fewer or more channels 270. The method 200 may begin at operation 252 with a master station 102 contending for the wireless medium 206. The method 200 continues at operation 254 with a downlink transmission from the master station 102. For example, the master station 102 may transmit a trigger frame for a random access transmission opportunity (TF-R) 208. A random access transmission opportunity is a duration where devices may contend for sub-channels specifically assigned for random access in accordance with the TF-R 208.

The master station 102 may transmit the TF-R 208 on each of the channels 270. In some embodiments the master station 102 may transmit just one TF-R 208, which may be on a primary channel 270 or may be on multiple channels 270. In some embodiments, the TF-R includes a duration of the random access transmission opportunity and may include an indication of channels 270 that may be used for the random access transmission opportunity. In some embodiments, the TF-R 208 may include an indication of the sub-channels 270 that are to be used for the random access transmission opportunity. For example, as illustrated there are two sub-channels for each channel 270 the TF-R 208 is transmitted on. For example, TF-R 208.1 may be transmitted on channel 270.1 and uplink frames 210.1 and uplink frame 210.2 may be transmitted on two sub-channels of channel 270.1.

In some embodiments the master station 102 may assign pre-association identifiers to pre-association HEW STAs 104. For example, the TF-R 208 may include a pre-association identifier that is to be used by a HEW station 104 that receives the TF-R 208. The TF-R 208 may include multiple pre-association identifiers for use on different sub-channels. For example, the TF-R 208.1 may include two pre-association identifiers for use on sub-channels where uplink frame 210.1 and uplink frame 210.2 are transmitted on.

In some embodiments the TF-Rs 208 may include a restriction on the type of device that is permitted to transmit in the random access transmission opportunity. For example, the TF-R 208 may include an indication that only pre-association HEW STAs 104 may transmit within the random access transmission opportunity, and/or that only low power HEW devices 104 may transmit within the random access transmission opportunity. The TF-R 208 may be termed, in some embodiments, a downlink synchronization.

The method 200 may continue at operation 256 with HEW STAs 104 transmitting uplink frames 210. For example, the uplink frames 210 may be uplink management frames 210. The uplink frames 210 may include a a pre-association identifier generated by the HEW STAs 104. The uplink frames 210 may include a pre-association identifier indicated in the TF-R 208. The HEW STAs 104 may select a sub-channel based on the TF-R 208, which may be a random selection of a sub-channel and then may set off a back-off counter and if the back-off counter decrements to 0 then the HEW STA 104 may transmit on the selected sub-channel. For example, the HEW STA 104 may transmit an uplink frame 210.1. In some embodiments, the HEW STA 104 may randomly generate a pre-association ID 362, which may be termed in some embodiments a token ID, when the counter decrements to 0.

Figure 3:
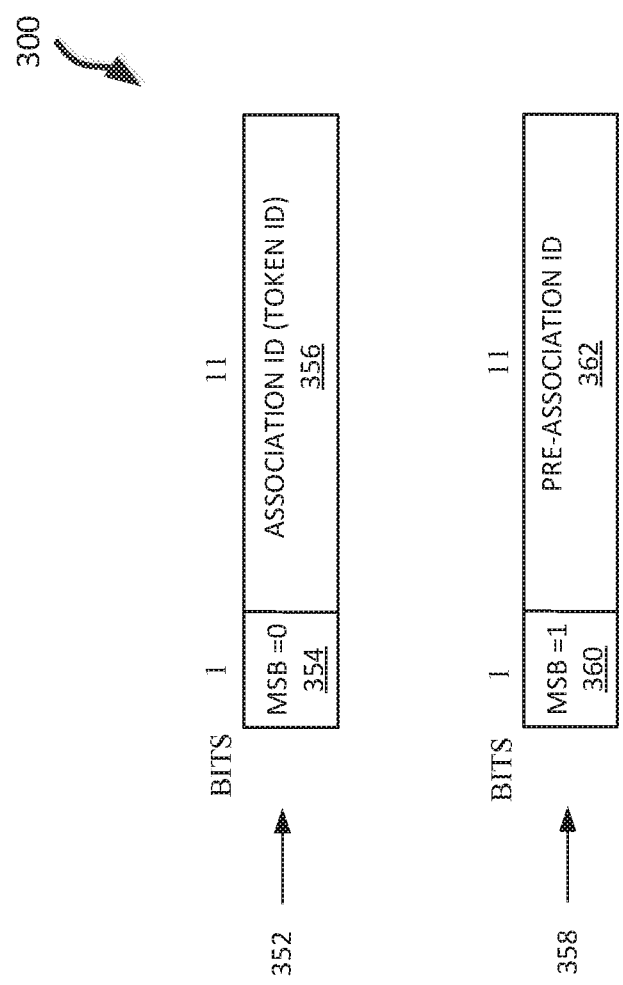
FIG. 3 illustrates an association identifier (ID) field and pre-association ID field in accordance with some embodiments.

FIG. 3 illustrates an association identifier (ID) field 352 and pre-association ID field 358 in accordance with some embodiments. FIG. 3 will be described in conjunction with FIG. 2. Illustrated in FIG. 3 is an association ID field 356 and pre-association ID field 362. The association ID field 352 may include an 11 bit field for an association ID 356 and a one bit field 354 (e.g., the most significant bit MSB) for an indication of whether the association ID 356 is an association ID 356 or a pre-association ID 362.

The pre-association ID field 358 may include an 11 bit field for a pre-association ID 362 and a one bit field 360 for an indication of whether the pre-association ID 362 is an association ID 356 or a pre-association ID 362. In some embodiments a different number of bits may be use for the indication of whether the ID field is an association ID 356 or a pre-association ID 362.

Figure 4:
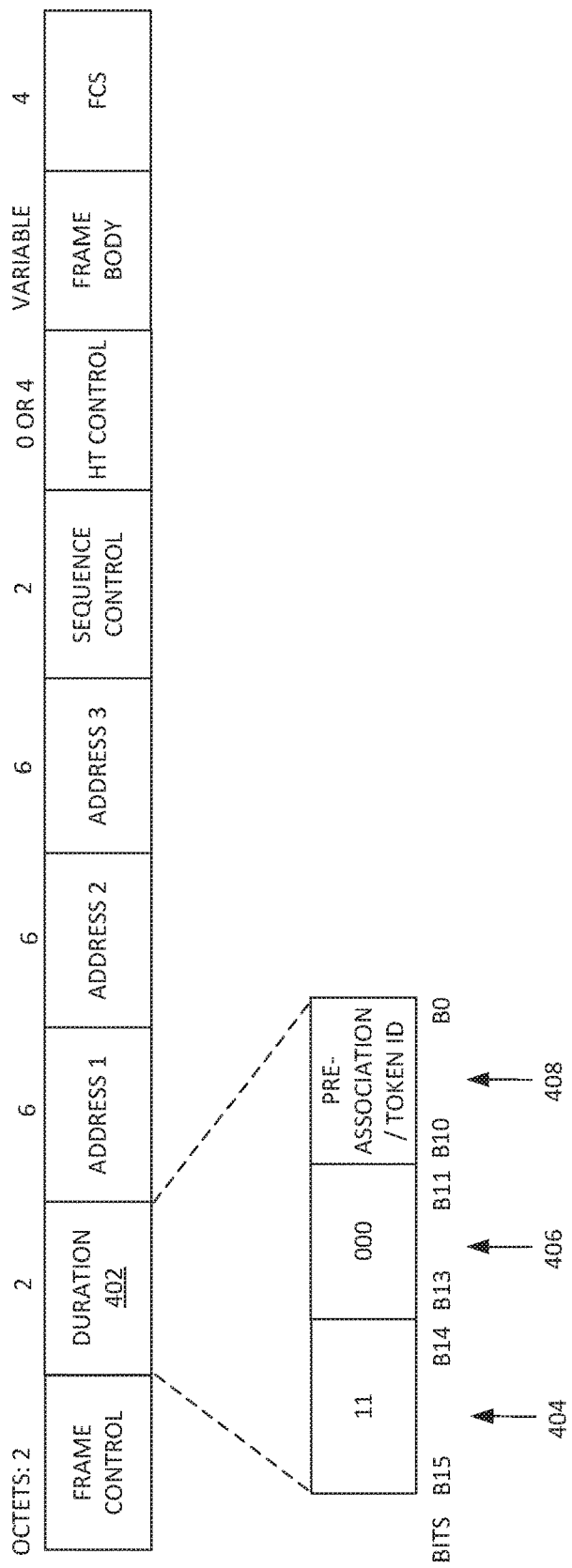
FIG. 4 illustrates a MAC header of a pre-association uplink management frame in accordance with some embodiments.

FIG. 4 illustrates a MAC header of a pre-association uplink management frame 400 in accordance with some embodiments. Illustrated in FIG. 4 is a duration 402 field which may be used in the random access transmission opportunity for a pre-association identifier 362. The duration 402 field may be used for the pre-association identifier 362 because the duration of the pre-association uplink management frame 400 may be determined by the TF-R. In some embodiments, the bits B0 through B10 may be used for the pre-association identifier 362.

Returning to FIG. 2, the uplink frame 210 may be a pre-association uplink management frame 400. In some embodiments two HEW STAs 104 may transmit on a same sub-channel an uplink frame 210. For example, two HEW STAs 104 may simultaneously transmit uplink frames 210.1. The master station 102 may only receive one of the uplink frames 210.1. One of the HEW STAs 104 may be a low power HEW STA 104. The uplink frames 210.1 may be an association request. In some embodiments, the HEW STAs 104 may transmit the uplink frames 210.1 with the same pre-association ID 362 since the pre-association ID 362 may have been generated by the master station 102 and the TF-R 208 may indicate a pre-association ID 362 to be used for a particular sub-channel. The uplink frames 210 may be transmitted in accordance with OFDMA.

Figure 5:
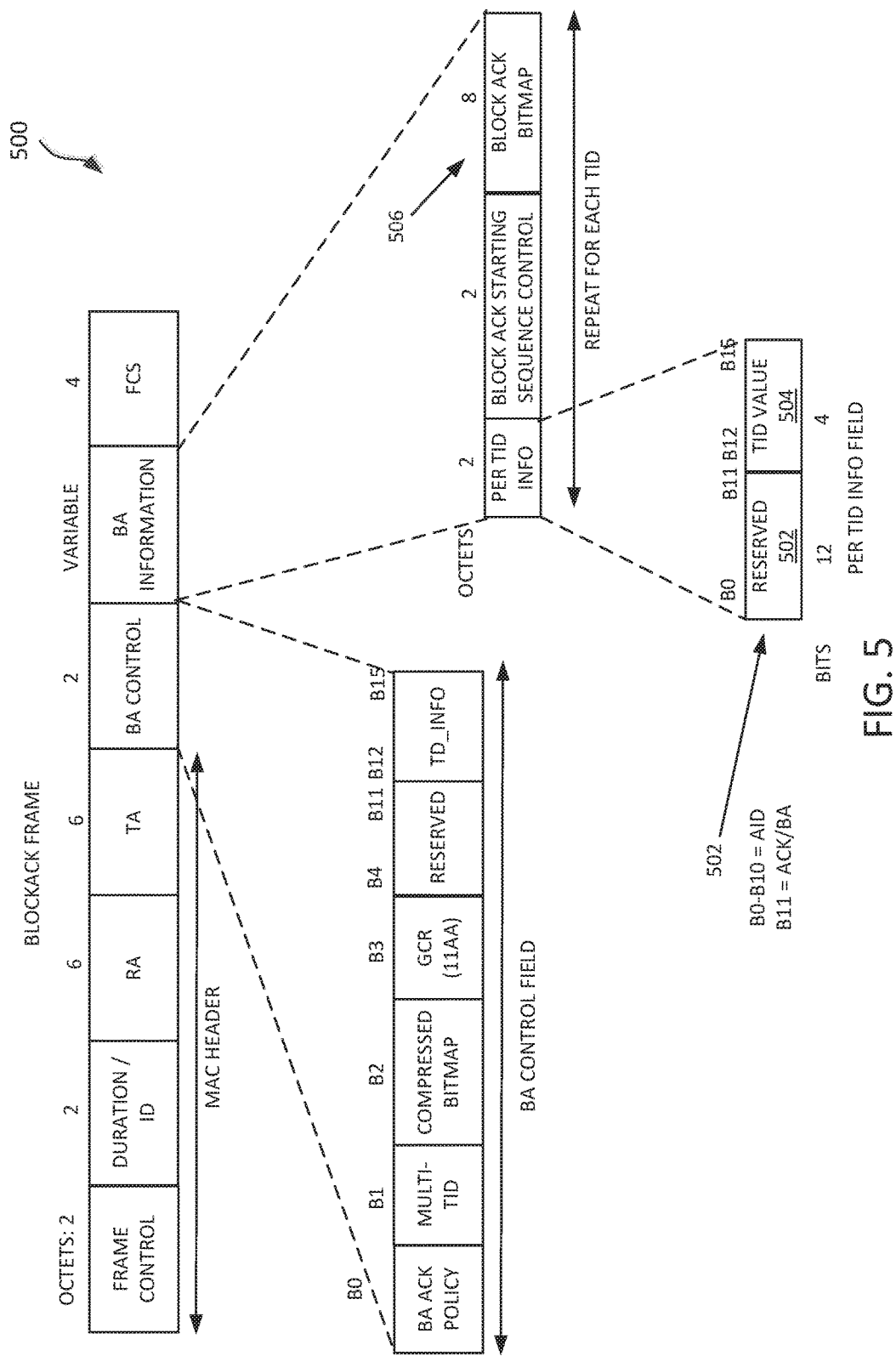
FIG. 5 illustrates an OFDMA ack in accordance with some embodiments.

FIG. 5 will be disclosed in conjunction with FIG. 2. FIG. 5 illustrates an OFDMA ack 500 in accordance with some embodiments. Illustrated in FIG. 5 is a block ack frame which may be used for an OFDMA ack 500. A reserved 502 subfield may be used to indicate the pre-association ID 358 (token ID) in bits b0-b10 or an association ID 353. A bit 11 of reserved 502 subfield may be used to indicate that the block ack frame is being used as an OFDMA ack 500, which indicates that subfields block ack starting sequence control and block ack bitmap may be ignored. The traffic identifier (TID) value 504 subfield may be used to indicate whether the bits b0-b10 are a pre-association ID 358 or an association ID 353. For example, TID value of 1111 may indicate pre-association identifier in bits B0-B10 of BA Information field. In some embodiments, if all the HEW STAs 104 that have sent uplink frames 210 are pre-association HEW STAs 104 then the TID value 504 subfield may be ignored. In some embodiments, the block ack bitmap 506 subfield may be used to indicate a MAC address of pre-association HEW STA 104.

Returning to FIG. 2, the method 200 may continue with the master station 102 transmitting a downlink OFDMA ack 212. For example, the downlink OFDMA ack 212 may be an OFDMA ack 500 as disclosed in conjunction with FIG. 5. In some embodiments, the OFDMA ack 212 may include a MAC address of the HEW STA 104. In some embodiments, as described above two HEW STAs 104, e.g. STA 1 and STA 2, may transmit uplink frames 210 simultaneously on the same sub-channel with the same pre-association ID 358. One of the uplink frames 210 may have reached the master station 102. The master station 102 may send a downlink OFDMA ack 212 in response to the one uplink frame 210 that reached the master station 102. For example, STA 1's uplink frame 210 may have reached the master station 102. STA 2 whose uplink frame 210 did not reach the master station 102 may interpret the downlink OFDMA ack 212 as an ack of its uplink frame 210 when its frame did not reach the master station 102. STA 2 may be a lower power HEW STA 104 than STA 1. STA 2 may determine that its uplink frame 210 actually did not reach the master station 102 after a downlink OFDMA frame 216 reaches STA 2 and the MAC address does not match the MAC address of STA 2. In some embodiments, the master station 102 may include a MAC address in the DL OFDMA ack 212. For example, a field of the block ack frame of FIG. 5 that is not being used for the OFDMA ack 500 may be used such as block ack bitmap 506 subfield.

In some embodiments, the method 200 may end. In some embodiments, the method 200 may continue at operation 260 with a master station 102 contending for the wireless medium 214. The method 200 may continue at operation 262 with the master station 102 transmitting downlink OFDMA frames 216. The OFDMA frames 216 may include a trigger frame for a downlink transmission opportunity. The OFDMA frames 216 may include association IDs 352 for the HEW STAs 104. The OFDMA frames 216 may include a MAC address of the corresponding HEW STA 104. The method 200 may continue at operation 264 with the HEW STAs 104 transmitting acknowledgements. The HEW STAs 104 may transmit acknowledgments 218 on the same sub-channel as the HEW STA 104 receive the OFDMA frame 216. The method 200 may end. In some embodiments the method 200 may continue with the HEW STAs 104 transmitting and receiving packets with an association ID 362.

Figure 6:
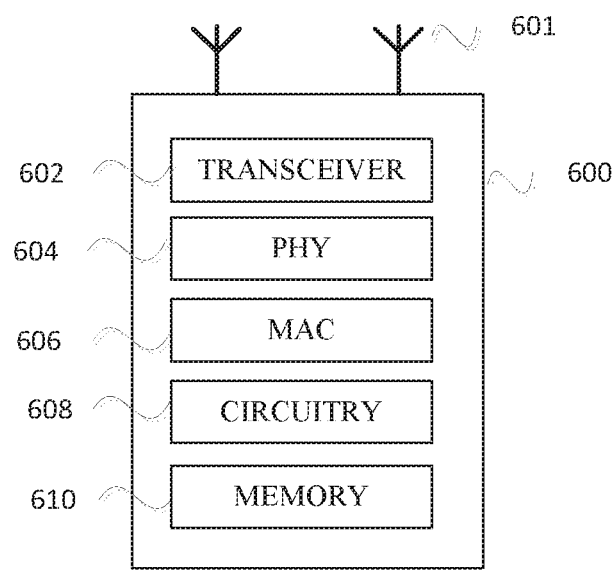
FIG. 6 illustrates a HEW device in accordance with some embodiments.

FIG. 6 illustrates a HEW device 600 in accordance with some embodiments. HEW device 600 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 600 may be suitable for operating as master station 102 (FIG. 1) or a HEW STA 104 (FIG. 1). In accordance with embodiments, HEW device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be HEW compliant layers and may also be compliant with one or more legacy IEEE 802.13 standards. MAC circuitry 606 may be arranged to configure packets such as a physical layer convergence procedure (PLCP) protocol data unit (PPDUs) and arranged to transmit and receive PPDUs, among other things. HEW device 600 may also include circuitry 608 and memory 610 configured to perform the various operations described herein. The circuitry 608 may be coupled to the transceiver 602, which may be coupled to the transmit/receive element 601. While FIG. 6 depicts the circuitry 608 and the transceiver 602 as separate components, the circuitry 608 and the transceiver 602 may be integrated together in an electronic package or chip.

In some embodiments, the MAC circuitry 606 may be arranged to contend for a wireless medium during a contention period to receive control of the medium for the HEW control period and configure an HEW PPDU. In some embodiments, the MAC circuitry 606 may be arranged to contend for the wireless medium based on channel contention settings, a transmitting power level, and a CCA level.

The PHY circuitry 604 may be arranged to transmit the HEW PPDU. The PHY circuitry 604 may include circuitry for modulation/demodulation, upconversion/downconversion, filtering, amplification, etc. In some embodiments, the circuitry 608 may include one or more processors. The circuitry 608 may be configured to perform functions based on instructions being stored in a RAM or ROM, or based on special purpose circuitry. The circuitry 608 may include processing circuitry and/or transceiver circuitry in accordance with some embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In some embodiments, the circuitry 608 may be configured to perform one or more of the functions and/or methods described herein and/or in conjunction with FIGS. 1-6.

In some embodiments, the transmit/receive elements 601 may be two or more antennas that may be coupled to the PHY circuitry 604 and arranged for sending and receiving signals including transmission of the HEW packets. The transceiver 602 may transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations to perform one or more of the functions and/or methods described herein and/or in conjunction with FIGS. 1-6.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11 ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 600 may use 4× symbol duration of 802.11n or 802.11 ac.

In some embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 600 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a high-efficiency wireless local-area network (HEW) master station. The HEW master station including transceiver circuitry and processing circuitry configured to: transmit a trigger frame for uplink random access (TF-R), receive one or more responses to the trigger frame in accordance with orthogonal frequency division multiple-access (OFDMA) from one or more pre-association stations. Each response includes a pre-association identifier corresponding to one of the one or more pre-association stations. The circuitry may be further configured to transmit one or more acknowledgements to the one or more pre-association stations in accordance with OFDMA.

In Example 2, the subject matter of Example 1 can optionally include where the one or more acknowledgements are a block acknowledgement frame including the pre-association identifier for each of the one or more pre-association stations.

In Example 3, the subject matter of Example 1 or Example 2 can optionally include where the block acknowledgement frame further includes a field to indicate whether the block acknowledgment frame is for stations with pre-association identifiers or stations with association identifiers.

In Example 4, the subject matter of Example 3 can optionally include where the field is to be ignored if all the one or more responses are from pre-association stations.

In Example 5, the subject matter of Example 4 can optionally include where the block acknowledgement frame further comprise a field to indicate that the block acknowledgement frame is a block acknowledgement frame to an uplink management frame from unassociated stations.

In Example 6, the subject matter of any of Examples 1-5 can optionally include where the transceiver circuitry and processing circuitry is configured to receive data frames from stations with association identifiers and refrain from receiving data frames from stations with pre-association identifiers.

In Example 7, the subject matter of any of Examples 1-6 can optionally include where the TF-R comprises at least one pre-association identifier corresponding to one of the one or more pre-association stations, and where the transceiver circuitry and processing circuitry are further configured to transmit the TF-R on one or more channels with the at least one pre-association identifier in accordance with OFDMA.

In Example 8, the subject matter of any of Examples 1-7 can optionally include where the TF-R comprises an indication of one or more channels for the one or more pre-association stations to transmit on and a duration of a random access transmission opportunity.

In Example 9, the subject matter of Example 8 can optionally include where the TF-R indicates that only pre-association stations are to transmit in the random access transmission opportunity.

In Example 10, the subject matter of any of Examples 1-9 can optionally include where the pre-association identifiers are generated by the one or more pre-association stations.

In Example 11, the subject matter of Example 10 can optionally include where the one or more pre-association stations randomly generate the corresponding pre-association identifier if a back-off counter decrements to a predetermined value, wherein the back-off counter is for accessing a channel in accordance with OFDMA.

In Example 12, the subject matter of any of Examples 1-11 can optionally include where the one or more responses are pre-association uplink management frames.

In Example 13, the subject matter of Example 12 can optionally include where the pre-association identifier corresponding to one of the one or more pre-association stations is transmitted within a duration field of the pre-association uplink management frames.

In Example 14, the subject matter of any of Examples 1-13 can optionally include where the transceiver circuitry and processing circuitry is further configured to generate the one or more acknowledgements to the one or more pre-association stations with a media access control address of the corresponding one or more pre-association stations.

In Example 15, the subject matter of any of Examples 1-14 can optionally include memory coupled to the transceiver circuitry and processing circuitry; and, one or more antennas coupled to the transceiver circuitry and processing circuitry.

Example 16 is a non-transitory computer-readable storage medium that stores instructions for execution by one or more processors. The instructions to configure the one or more processors to cause a high-efficiency wireless local-area network (HEW) master station to: transmit a trigger frame for uplink random access (TF-R) and receive one or more responses to the trigger frame in accordance with orthogonal frequency division multiple-access (OFDMA) from one or more pre-association stations. Each response comprises a pre-association identifier corresponding to one of the one or more pre-association stations. The instructions further to configure the one or more processors to cause the HEW master station to transmit one or more acknowledgements to the one or more pre-association stations in accordance with OFDMA.

In Example 17, the subject matter of Example 16 can optionally include where the one or more acknowledgements are a block acknowledgement frame comprising the pre-association identifier for each of the one or more pre-association stations.

Example 18 is an apparatus of a high-efficiency wireless local-area network (HEW) station. The HEW station comprising transceiver circuitry and processing circuitry configured to: receive an acknowledgement frame comprising one or more identifiers, and determine whether the acknowledgement frame is for a station with a pre-association identifier or a station with an association identifier based on a field of the acknowledgement that indicates whether the acknowledgment is for the station with the pre-association identifier or the station with the association identifier.

In Example 19, the subject matter of Example 18 can optionally include where the acknowledgement frame is a block acknowledgement frame comprising a field to indicate whether the block acknowledgment frame is for stations with pre-association identifiers or stations with association identifiers.

In Example 20, the subject matter of Example 19 can optionally include where the field is one of a traffic identifier field or a block acknowledgment bitmap field of the block acknowledgement frame in accordance with Institute of Electrical and Electronic Engineers (IEEE) 802.11.

In Example 21, the subject matter of Example 19 can optionally include where a value of the field of 1111 indicates the block acknowledgement frame is for the station with the pre-association identifier, and wherein a pre-association identifier and an association identifier are to be indicated in a same field of the acknowledgment frame.

In Example 22, the subject matter of any of Examples 18-21 can optionally include where a master station is configured to receive data frames from stations with association identifiers and refrain from receiving data frames from stations with pre-association identifiers.

In Example 23, the subject matter of any of Examples 18-21 can optionally include memory coupled to the transceiver circuitry and processing circuitry; and, one or more antennas coupled to the transceiver circuitry and processing circuitry.

Example 24 is a method performed by a high-efficiency wireless local-area network (HEW) station. The method including transmitting a trigger frame for uplink random access (TF-R), and receiving one or more responses to the trigger frame in accordance with orthogonal frequency division multiple-access (OFDMA) from one or more pre-association stations. Each response comprises a pre-association identifier corresponding to one of the one or more pre-association stations. The method further includes transmitting one or more acknowledgements to the one or more pre-association stations in accordance with OFDMA.

In Example 25, the subject matter of Example 24 can optionally include where the one or more acknowledgements are a block acknowledgement frame comprising for each of the one or more pre-association stations a corresponding pre-association identifier.

Example 26 is an apparatus of a high-efficiency wireless local-area network (HEW) master station. The apparatus comprising means for transmitting a trigger frame for uplink random access (TF-R), and means for receiving one or more responses to the trigger frame in accordance with orthogonal frequency division multiple-access (OFDMA) from one or more pre-association stations. Each response comprises a pre-association identifier corresponding to one of the one or more pre-association stations. The apparatus further comprises means for transmitting one or more acknowledgements to the one or more pre-association stations in accordance with OFDMA.

In Example 27, the subject matter of Example 26 can optionally include where the one or more acknowledgements are a block acknowledgement frame comprising the pre-association identifier for each of the one or more pre-association stations.

In Example 28, the subject matter of Example 27 can optionally include where the block acknowledgement frame further includes a field to indicate whether the block acknowledgment frame is for stations with pre-association identifiers or stations with association identifiers.

In Example 29, the subject matter of Example 28 can optionally include where the field is to be ignored if all the one or more responses are from pre-association stations.

In Example 30, the subject matter of Example 29 can optionally include where the block acknowledgement frame further comprise a field to indicate that the block acknowledgement frame is a block acknowledgement frame to an uplink management frame from unassociated stations.

In Example 31, the subject matter of any of Examples 26-30 can optionally include means for receiving data frames from stations with association identifiers and refrain from receiving data frames from stations with pre-association identifiers.

In Example 32, the subject matter of any of Examples 26-31 can optionally include where the TF-R comprises at least one pre-association identifier corresponding to one of the one or more pre-association stations, and wherein the apparatus further includes means for transmitting the TF-R on one or more channels with the at least one pre-association identifier in accordance with OFDMA.

In Example 33, the subject matter of any of Examples 26-32 can optionally include where the TF-R comprises an indication of one or more channels for the one or more pre-association stations to transmit on and a duration of a random access transmission opportunity.

In Example 34, the subject matter of Example 33 can optionally include where the TF-R indicates that only pre-association stations are to transmit in the random access transmission opportunity.

In Example 35, the subject matter of any of Examples 26-34 can optionally include where the pre-association identifiers are generated by the one or more pre-association stations.

In Example 36, the subject matter of Example 35 can optionally include where the one or more pre-association stations randomly generate the corresponding pre-association identifier if a back-off counter decrements to a predetermined value, wherein the back-off counter is for accessing a channel in accordance with OFDMA.

In Example 37, the subject matter of any of Examples 25-36 can optionally include where the one or more responses are pre-association uplink management frames.

In Example 38, the subject matter of Example 37 can optionally include where the pre-association identifier corresponding to one of the one or more pre-association stations is transmitted within a duration field of the pre-association uplink management frames.

In Example 39, the subject matter of any of Examples 25-38 can optionally include means for generating the one or more acknowledgements to the one or more pre-association stations with a media access control address of the corresponding one or more pre-association stations.

In Example 40, the subject matter of any of Examples 25-39 can optionally include means for sending and receiving radio frequency signals coupled to means for processing radio frequency signals.

Example 41 is an apparatus of a high-efficiency wireless local-area network (HEW) station. The apparatus including means for receiving an acknowledgement frame comprising one or more identifiers, and means for determining whether the acknowledgement frame is for a station with a pre-association identifier or a station with an association identifier based on a field of the acknowledgement that indicates whether the acknowledgment is for the station with the pre-association identifier or the station with the association identifier.

In Example 42, the subject matter of Example 41 can optionally include where the acknowledgement frame is a block acknowledgement frame comprising a field to indicate whether the block acknowledgment frame is for stations with pre-association identifiers or stations with association identifiers.

In Example 43, the subject matter of Example 41 can optionally include where the field is one of a traffic identifier field or a block acknowledgment bitmap field of the block acknowledgement frame in accordance with Institute of Electrical and Electronic Engineers (IEEE) 802.11.

In Example 44, the subject matter of any of Examples 41-43 can optionally include where a value of the field of 1111 indicates the block acknowledgement frame is for the station with the pre-association identifier, and wherein a pre-association identifier and an association identifier are to be indicated in a same field of the acknowledgment frame.

In Example 45, the subject matter of any of Examples 41-44 can optionally include where a master station is configured to receive data frames from stations with association identifiers and refrain from receiving data frames from stations with pre-association identifiers.

In Example 46, the subject matter of any of Examples 41-45 can optionally include means for sending and receiving radio frequency signals coupled to means for processing radio frequency signals.

Example 47 is a non-transitory computer-readable storage medium that stores instructions for execution by one or more processors. The instructions to configure the one or more processors to cause a high-efficiency wireless local-area network (HEW) station to: receive an acknowledgement frame comprising one or more identifiers, and determine whether the acknowledgement frame is for a station with a pre-association identifier or a station with an association identifier based on a field of the acknowledgement that indicates whether the acknowledgment is for the station with the pre-association identifier or the station with the association identifier.

In Example 48, the subject matter of Example 47 can optionally include where the acknowledgement frame is a block acknowledgement frame comprising a field to indicate whether the block acknowledgment frame is for stations with pre-association identifiers or stations with association identifiers.

In Example 49, the subject matter of Example 47 or 48 can optionally include where the field is one of a traffic identifier field or a block acknowledgment bitmap field of the block acknowledgement frame in accordance with Institute of Electrical and Electronic Engineers (IEEE) 802.11.

In Example 50, the subject matter of any of Examples 47-49 can optionally include where a value of the field of 1111 indicates the block acknowledgement frame is for the station with the pre-association identifier, and wherein a pre-association identifier and an association identifier are to be indicated in a same field of the acknowledgment frame.

In Example 51, the subject matter of any of Examples 47-50 can optionally include where a master station is configured to receive data frames from stations with association identifiers and refrain from receiving data frames from stations with pre-association identifiers.

Example 52 is a method performed by a high-efficiency wireless local-area network (HEW) station. The method including receiving an acknowledgement frame comprising one or more identifiers, and determining whether the acknowledgement frame is for a station with a pre-association identifier or a station with an association identifier based on a field of the acknowledgement that indicates whether the acknowledgment is for the station with the pre-association identifier or the station with the association identifier.

In Example 53, the subject matter of Examples 52 can optionally include where the acknowledgement frame is a block acknowledgement frame comprising a field to indicate whether the block acknowledgment frame is for stations with pre-association identifiers or stations with association identifiers.

In Example 54, the subject matter of Examples 52 or 53 can optionally include where the field is one of a traffic identifier field or a block acknowledgment bitmap field of the block acknowledgement frame in accordance with Institute of Electrical and Electronic Engineers (IEEE) 802.11.

In Example 55, the subject matter of any of Examples 52-54 can optionally include where a value of the field of 1111 indicates the block acknowledgement frame is for the station with the pre-association identifier, and wherein a pre-association identifier and an association identifier are to be indicated in a same field of the acknowledgment frame.

In Example 56, the subject matter of any of Examples 52-5 can optionally include where a master station is configured to receive data frames from stations with association identifiers and refrain from receiving data frames from stations with pre-association identifiers.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point, the apparatus comprising:
    memory; and
    processing circuitry coupled to the memory, the processing circuitry configured to:
        encode a trigger frame for random access (TF-RA), the TF-RA comprising uplink (UL) resource allocations, wherein each UL resource allocation of the UL resource allocations comprises an indication whether a corresponding UL resource allocation is for unassociated HE stations;
        generate a signal to cause the HE access point to wirelessly transmit the TF-RA;
        decode UL frames in accordance with the UL resource allocations, wherein an UL frame of the UL frames from an unassociated HE station comprises a media access control (MAC) address of the unassociated HE station; and
        encode a multi-station block acknowledgement (BACK) to acknowledge the UL frames, wherein the multi-station BACK comprises block acknowledgment (BA) information fields to acknowledge UL frames, and wherein each BA information field of the BA information fields comprises an association identification (AID) and traffic identification (TID) information field, a BACK starting sequence control field, and when the BA information field is to acknowledge an UL frame from an associated HE station, a BACK bitmap field, and when the BA information field is to acknowledge the UL frame for an unassociated HE station a receiver address (RA) field, wherein the AID and TID information field comprises an association identification (AID) field and an TID field,
        and wherein when the BA information field of the BA information fields is to acknowledge the UL frame from the unassociated HE station, a value of the RA field is set to the MAC address of the unassociated HE station, and wherein the AID field and the TID field are set to values to indicate the BA information field is to acknowledge the UL frame from the unassociated station; and
        generate a signal to cause the HE access point to wirelessly transmit the multi-station BACK.

2. The apparatus of claim 1, wherein a value of the TID field is set to 15 and the TID field comprises 4 bits.

3. The apparatus of claim 1, wherein the TF-RA further comprises a duration field, the value of the duration field indicating a duration of the UL resource allocations.

4. The apparatus of claim 1, wherein the TF-RA further comprises an indication of channels for the unassociated HE stations to use.

5. The apparatus of claim 1, wherein the UL frame from the associated HE station is a management frame.

6. The apparatus of claim 5, wherein the management frame is an association request.

7. The apparatus of claim 1, wherein the multi-station BACK further comprises a block acknowledgment (BA) control field, wherein the BA control field comprises a BA acknowledgement policy field.

8. The apparatus of claim 1, wherein the MAC address of the unassociated HE station is a transmitter address of an UL frame of the UL frames transmitted by the unassociated HE station.

9. The apparatus of claim 1, wherein the processing circuitry is further configured to:
    in response to an UL frame of the UL frames from the unassociated HE station, encode a second trigger frame, the second trigger frame comprising downlink (DL) data for the unassociated HE station, wherein the DL data comprises an AID for the unassociated HE station; and
    configured the HE access point to wireless transmit the second trigger frame.

10. The apparatus of claim 9, wherein the second trigger frame further comprises a second UL resource allocation for the unassociated HE station, and wherein the processing circuitry is further configured to:
  decode a second UL frame from the unassociated HE station in accordance with the second UL resource allocation, wherein the second UL frame comprises the AID for the unassociated station.

11. The apparatus of claim 1, wherein the processing circuitry is further configured to:
  decode UL frame in accordance with the UL resource allocations and one or both of orthogonal frequency division multiple-access (OFDMA) or multi-user multiple-input multi-output (MU-MIMO).

12. The apparatus of claim 1, wherein the HE access point and the unassociated HE stations are each one from the following group: an Institute of Electrical and Electronic Engineers (IEEE) 802.11ax access point, an IEEE 802.11ax station, a high-efficiency (HE) STA, an IEEE 802.11 station, and an IEEE 802.11 access point.

13. The apparatus of claim 1, further comprising:
  transceiver circuitry coupled to the processing circuitry; and
  one or more antennas coupled to the transceiver circuitry.

14. A non-transitory computer-readable storage medium that stores instructions for execution by one or more processors of an apparatus of a high-efficiency (HE) access point, the instructions to configure the one or more processors to:
  encode a trigger frame for random access (TF-RA), the TF-RA comprising uplink (UL) resource allocations, wherein each UL resource allocation of the UL resource allocations comprises an indication whether a corresponding UL resource allocation is for unassociated HE stations;
  generate a signal to cause the HE access point to wirelessly transmit the TF-RA;
  decode UL frames in accordance with the UL resource allocations, wherein an UL frame of the UL frames from an unassociated HE station comprises a media access control (MAC) address of the unassociated HE station; and
  encode a multi-station block acknowledgement (BACK) to acknowledge the UL frames, wherein the multi-station BACK comprises block acknowledgment (BA) information fields to acknowledge UL frames, and wherein each BA information field of the BA information fields comprises an association identification (AID) and traffic identification (TID) information field, a BACK starting sequence control field, and when the BA information field is to acknowledge an UL frame from an associated HE station, a BACK bitmap field, and when the BA information field is to acknowledge the UL frame for an unassociated HE station a receiver address (RA) field, wherein the AID and TID information field comprises an association identification (AID) field and an TID field,
  and wherein when the BA information field of the BA information fields is to acknowledge the UL frame from the unassociated HE station, a value of the RA field is set to the MAC address of the unassociated HE station, and wherein the AID field and the TID field are set to values to indicate the BA information field is to acknowledge the UL frame from the unassociated station; and
  generate a signal to cause the HE access point to wirelessly transmit the multi-station BACK.

15. The non-transitory computer-readable storage medium of claim 14, wherein a value of the TID field is set to 15 and the TID field comprises 4 bits.

16. The non-transitory computer-readable storage medium of claim 14, wherein the TF-RA further comprises a duration field, the value of the duration field indicating a duration of the UL resource allocations.

17. The non-transitory computer-readable storage medium of claim 14, wherein the TF-RA further comprises an indication of channels for the unassociated HE stations to use.

18. A method performed by an apparatus of a high-efficiency (HE) access point, the method comprising:
  encoding a trigger frame for random access (TF-RA), the TF-RA comprising uplink (UL) resource allocations, wherein each UL resource allocation of the UL resource allocations comprises an indication whether a corresponding UL resource allocation is for unassociated HE stations;
  generating a signal to cause the HE access point to wirelessly transmit the TF-RA;
  decoding UL frames in accordance with the UL resource allocations, wherein an UL frame of the UL frames from an unassociated HE station comprises a media access control (MAC) address of the unassociated HE station; and
  encoding a multi-station block acknowledgement (BACK) to acknowledge the UL frames, wherein the multi-station BACK comprises block acknowledgment (BA) information fields to acknowledge UL frames, and wherein each BA information field of the BA information fields comprises an association identification (AID) and traffic identification (TID) information field, a BACK starting sequence control field, and when the BA information field is to acknowledge an UL frame from an associated HE station, a BACK bitmap field, and when the BA information field is to acknowledge the UL frame for an unassociated HE station a receiver address (RA) field, wherein the AID and TID information field comprises an association identification (AID) field and an TID field,
  and wherein when the BA information field of the BA information fields is to acknowledge the UL frame from the unassociated HE station, a value of the RA field is set to the MAC address of the unassociated HE station, and wherein the AID field and the TID field are set to values to indicate the BA information field is to acknowledge the UL frame from the unassociated station; and
  generating a signal to cause the HE access point to wirelessly transmit the the multistation BACK.

19. The method of claim 18, wherein the TF-RA further comprises a duration field, the value of the duration field indicating a duration of the UL resource allocations.

20. An apparatus of a high-efficiency (HE) station, the apparatus comprising:
  memory; and
  processing circuitry coupled to the memory, the processing circuitry configured to:
  decode a trigger frame for random access (TF-RA), the TF-RA comprising uplink (UL) resource allocations, wherein each UL resource allocation of the UL resource allocations comprises an indication whether a corresponding UL resource allocation is for unassociated HE stations;
  encode an UL frame in accordance with an UL resource allocation for unassociated HE stations of the UL resource allocations, wherein the UL frame comprises a media access control (MAC) address of the HE station;

generate a signal to cause the HE station to wirelessly transmit the UL frame; and decode a multi-station block acknowledgement (BACK) to acknowledge the UL frame, wherein the multi-station BACK comprises block acknowledgment (BA) information fields to acknowledge UL frames, and determine a BA information field is for the UL frame when a value of a receiver address (RA) field of the BA information field is equal to a media access control (MAC) address of the HE station and when a value of an association identification (AID) and traffic identification (TID) information field indicates the BA information field is for an unassociated HE station.

21. The apparatus of claim 20, wherein the UL frame is a management frame requesting association with a HE access point.

22. The apparatus of claim 20, wherein the UL frame is to be transmitted in accordance with one or both of orthogonal frequency division multiple access (OFDMA) and multiple-user multiple-input multiple-output (MU-MIMO).

23. The apparatus of claim 20, further comprising transceiver circuitry coupled to the processing circuitry; and one or more antennas coupled to the transceiver circuitry.

* * * * *